United States Patent
Clements et al.

(10) Patent No.: US 10,609,094 B1
(45) Date of Patent: Mar. 31, 2020

(54) CONTROLLED-ENVIRONMENT FACILITY RESIDENT CONTACT TOOLS FOR INTELLIGENT CONTROLLED-ENVIRONMENT FACILITY RESIDENT COMMUNICATION AND/OR MEDIA DEVICE INTERFACES

(71) Applicant: Securus Technologies, Inc., Dallas, TX (US)

(72) Inventors: Alice J. Clements, Coppell, TX (US); Joseph Higgs, Fort Worth, TX (US); Matthew Smith, McKinney, TX (US)

(73) Assignee: Securus Technologies, Inc., Carrollton, TX (US)

( * ) Notice: Subject to any disclaimer, the term of this patent is extended or adjusted under 35 U.S.C. 154(b) by 317 days.

(21) Appl. No.: 15/285,835

(22) Filed: Oct. 5, 2016

(51) Int. Cl.
*H04L 29/06* (2006.01)
*H04L 12/58* (2006.01)

(52) U.S. Cl.
CPC .......... *H04L 65/1076* (2013.01); *H04L 51/12* (2013.01); *H04L 65/4015* (2013.01)

(58) Field of Classification Search
CPC ... H04M 3/22; H04M 3/2281; H04L 65/1076; H04L 65/4015; H04L 51/12
See application file for complete search history.

(56) References Cited

U.S. PATENT DOCUMENTS

| | | | | |
|---|---|---|---|---|
| 7,158,621 B2* | 1/2007 | Bayne | ................... | H04M 15/08 379/114.13 |
| 7,519,169 B1* | 4/2009 | Hingoranee | ...... | H04M 3/42068 379/114.13 |
| 7,529,357 B1* | 5/2009 | Rae | ......................... | H04M 3/38 370/261 |
| 8,929,525 B1* | 1/2015 | Edwards | ................ | H04N 7/147 379/114.21 |
| 9,055,167 B1* | 6/2015 | Keiser | ................... | H04M 15/08 |
| 9,094,569 B1* | 7/2015 | Humphries | .............. | H04N 7/14 |
| 9,380,082 B1* | 6/2016 | Keiser | .................... | H04N 7/181 |
| 9,420,094 B1* | 8/2016 | Keiser | ................ | G06K 9/00288 |
| 9,479,651 B1* | 10/2016 | Welker-Muraguri | ........................ | H04M 15/08 |
| 9,596,366 B1* | 3/2017 | Smith | ................ | H04N 1/00127 |
| 9,609,269 B2* | 3/2017 | Humphries | .............. | H04N 7/14 |

(Continued)

FOREIGN PATENT DOCUMENTS

| | | | | |
|---|---|---|---|---|
| CA | 2864267 A1 * | 10/2007 | .......... | H04M 3/2281 |
| EP | 1873988 A1 * | 1/2008 | | |
| WO | WO-2008064194 A2 * | 5/2008 | .......... | H04M 11/007 |

*Primary Examiner* — Kostas J Katsikis
(74) *Attorney, Agent, or Firm* — Fogarty LLP (57) ABSTRACT

Controlled-environment facility resident contact tools for intelligent controlled-environment facility resident communication and/or media device interfaces may be configured to present a contact list of non-residents of the controlled-environment facility for a respective resident of the controlled-environment facility, to the respective resident. The interface may also present the resident an interface to input name and contact information for the contacts. Additionally or alternatively, the system may auto-populate the contact list for at least one resident. Messages, such as nudges for the non-resident to take an action with respect to the resident, such as make a deposit to a trust account of the resident, set-up a video visitation with the resident, or the like, are transmitted to the contacts, in the name of the respective resident.

31 Claims, 3 Drawing Sheets

(56) References Cited

U.S. PATENT DOCUMENTS

| | | | |
|---|---|---|---|
| 9,621,714 B2* | 4/2017 | Seyfetdinov | H04M 3/42 |
| 9,680,903 B1* | 6/2017 | Keiser | H04L 67/06 |
| 9,723,262 B1* | 8/2017 | Humphries | H04N 7/14 |
| 9,736,428 B1* | 8/2017 | Edwards | H04M 3/56 |
| 9,742,935 B1* | 8/2017 | Shipman, Jr. | H04N 1/00241 |
| 9,871,548 B2* | 1/2018 | Hangsleben | G06F 1/1632 |
| 10,003,663 B2* | 6/2018 | Torgersrud | H04L 67/22 |
| 10,165,073 B1* | 12/2018 | Parampottil | H04L 67/22 |
| 10,452,337 B1* | 10/2019 | Clements | H04N 7/147 |
| 2007/0003026 A1* | 1/2007 | Hodge | H04M 3/533 379/88.1 |
| 2009/0228383 A1* | 9/2009 | Martinez | G06Q 30/04 705/35 |
| 2010/0105416 A1* | 4/2010 | Nadler | H04W 48/04 455/456.4 |
| 2010/0189228 A1* | 7/2010 | Seyfetdinov | H04M 3/42 379/88.14 |
| 2011/0110367 A1* | 5/2011 | Rae | H04M 3/2281 370/352 |
| 2011/0317685 A1* | 12/2011 | Torgersrud | H04L 12/66 370/352 |
| 2013/0058469 A1* | 3/2013 | Gongaware | H04M 3/4211 379/93.03 |
| 2014/0012771 A1* | 1/2014 | Dunbar | G06Q 30/0279 705/329 |
| 2014/0044242 A1* | 2/2014 | Hodge | H04M 3/533 379/68 |
| 2014/0080445 A1* | 3/2014 | Noonan | H04W 8/005 455/410 |
| 2014/0194084 A1* | 7/2014 | Noonan | H04W 4/029 455/404.1 |
| 2014/0229503 A1* | 8/2014 | Li | G06F 17/30477 707/770 |
| 2014/0253322 A1* | 9/2014 | Chapin | G08B 1/08 340/539.11 |
| 2014/0254777 A1* | 9/2014 | Olligschlaeger | H04M 3/2281 379/88.01 |
| 2014/0270126 A1* | 9/2014 | Torgersrud | H04M 3/38 379/189 |
| 2014/0280559 A1* | 9/2014 | Torgersrud | H04L 67/22 709/204 |
| 2014/0280631 A1* | 9/2014 | Torgersrud | H04L 51/34 709/206 |
| 2014/0287715 A1* | 9/2014 | Hodge | H04W 4/24 455/406 |
| 2015/0003289 A1* | 1/2015 | Slotte | H04W 64/00 370/254 |
| 2015/0016364 A1* | 1/2015 | Junell | H04W 4/023 370/329 |
| 2015/0200904 A1* | 7/2015 | Khanna | H04L 51/32 455/412.1 |
| 2015/0201081 A1* | 7/2015 | Hodge | H04M 15/83 379/88.12 |
| 2015/0262254 A1* | 9/2015 | Dunbar | G06Q 40/00 705/14.71 |
| 2016/0007201 A1* | 1/2016 | Torgersrud | H04W 12/08 455/411 |
| 2016/0191484 A1* | 6/2016 | Gongaware | H04L 63/08 726/7 |
| 2016/0191849 A1* | 6/2016 | Humphries | H04N 7/14 348/14.08 |
| 2017/0142368 A1* | 5/2017 | Smith | H04N 1/00127 |
| 2017/0201716 A1* | 7/2017 | Humphries | H04N 7/14 |
| 2017/0353404 A1* | 12/2017 | Hodge | G06F 17/30867 |

* cited by examiner

CONTROLLED-ENVIRONMENT FACILITY RESIDENT CONTACT TOOLS FOR INTELLIGENT CONTROLLED-ENVIRONMENT FACILITY RESIDENT COMMUNICATION AND/OR MEDIA DEVICE INTERFACES

CROSS-REFERENCE TO RELATED APPLICATION

This disclosure is related to co-owned and co-pending U.S. patent application Ser. No. 15/077,980, entitled, Indicator of Likelihood of Establishing a Communication Connection for Communication System, filed Mar. 23, 2016, which is incorporated herein by reference.

TECHNICAL FIELD

The present disclosure relates generally to controlled-environment facilities, more particularly to interfaces for intelligent controlled-environment facility resident communication and/or media devices, and specifically to controlled-environment facility resident contact tools for use in conjunction with intelligent controlled-environment facility resident communication and/or media device interfaces.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, etc. More recently, technological advances have allowed jails and prisons to provide other types of visitation, including individual-to-individual videoconferences and online chat sessions.

Traditional communication services provided to residents of controlled-environment facilities (such as correctional facilities) include allowing residents (inmates) to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents and non-residents of the controlled-environment facility. Such communications may be conducted by residents via intelligent controlled-environment facility resident communication and/or media devices, which may take the form of resident communications kiosks and/or personal wireless devices, such as a tablet computing device or smartphone, which may be adapted and/or approved for use in controlled-environment facility. Basically, all of these forms of communication aim to facilitate communication between a resident of a controlled-environment facility and a non-resident.

SUMMARY

The present invention is directed to systems and methods, which provide controlled-environment facility resident contact tools for intelligent controlled-environment facility resident communication and/or media device interfaces. In accordance therewith, an example controlled-environment facility communications system may be made up of at least a controlled-environment facility communications processing system, a controlled-environment facility administration and management system and controlled-environment facility resident communication and/or media device(s). Each of these devices may have a controlled-environment facility resident communication and/or media device operating system and a controlled-environment facility resident interface program, or the like. The resident communication and/or media device may be configured to run the controlled-environment facility resident interface on top of, or as part of, the operating system.

The controlled-environment facility resident interface program presents a contact list of non-residents of the controlled-environment facility for a respective resident of the controlled-environment facility, to the respective resident. This contact list may be maintained in conjunction with the controlled-environment facility communications processing system, the controlled-environment facility administration and management system, or the like. The controlled-environment facility resident interface may also present the resident an interface to input name and contact information for the contacts. Additionally or alternatively, the system may auto-populate the contact list, such as from a Pre-Approved Contact (PAC) list and/or Pre-Approved Number (PAN) list for the respective resident maintained by the controlled-environment facility communications processing and/or administration and management systems. As a further addition or alternative, the respective contact list may be auto-populated by the system based, at least in part, on recent electronic communications by the respective resident, including, but not limited to, electronic communications by the respective resident that were successfully connected.

Regardless, messages are transmitted to the contacts, via the controlled-environment facility communications processing system, in the name of the respective resident. These messages may be standardized requests common to all residents. However, the controlled environment facility may be able to create a configurable message and/or input by the resident may be accepted, via the controlled-environment facility resident interface. Input by the resident, via the controlled-environment facility resident interface may, for example, be to turn transmitting messages in the name of that resident on and off. Further, the messages may be instituted for transmission by the resident on the resident communication and/or media device, via the controlled-environment facility resident interface. The messages may take the form of "nudges" to the contacts to take an action with respect to the resident, such as a nudge to make a deposit to a trust account maintained for the benefit of the resident, initiate and/or setup a video visitation session with the resident, etc. Hence, the message may be a request to communicate with the contact. However, each contact may be provided options to block the transmission of messages to the contact in the name of the resident. That is, each contact may be provided options to opt in or opt out of the transmission of messages in the name of the resident, or the like.

As noted, transmission of the messages may, at least in part, be instituted by the resident, via the resident interface on the resident device. For example, input by the resident, via the resident interface, may be to transmit a same message, in the name of that resident, to every contact in the contact list of that resident. In any case, requests by residents to institute messages may be logged and a log of the requests may be viewable by controlled-environment facility staff members with an appropriate level of access. The number of requests by a particular resident to institute messages may be limited, such as based on a pre-configurable time period basis, to a particular phone number, a particular email address, or the like. Such a number of requests by a particular resident may be based at least in part on a privilege status of the particular resident.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The present systems and methods relate generally to communication and media use by residents of controlled-environment facilities. Embodiments of the present systems and methods provide controlled-environment facility resident contact tools, via intelligent controlled-environment facility resident communication and/or media device interfaces. Thus, the present systems and methods relate more particularly to providing a controlled-environment facility resident an interface for intelligent controlled-environment facility resident communication and/or media devices, specifically configured to provide controlled-environment facility resident contact tools for use in conjunction with such intelligent controlled-environment facility resident communication and/or media device interfaces. Hence, in accordance with various embodiments of the present systems and methods, controlled-environment facility resident contact tools for intelligent controlled-environment facility resident communication and/or media device interfaces may be configured to present a contact list of non-residents of the controlled-environment facility for a respective resident of the controlled-environment facility, to the respective resident. The interface may also present the resident an interface to input name and contact information for the contacts in accordance with embodiments of the present systems and methods. Additionally or alternatively, embodiments of the present systems and methods may auto-populate the contact list. Also, messages, such as nudges for the non-resident to take an action with respect to the resident, such as nudging the non-resident to make a deposit to a trust account of the resident, set-up a video visitation with the resident, or the like, are transmitted to the contacts, in the name of the respective resident, in accordance with embodiments of the present systems and methods.

In some correctional facilities (some) inmates have the privilege of use of a resident media device such as a tablet computing device, media player, kiosk, telephone video device, or the like, which may be specially adapted for use in the/a correctional facility, and/or may otherwise be approved for use in the correctional facility. Hence, a controlled-environment facility management system, or the like, may have more control over the resident media device than is typical for outside tablet computing device, media players, telephones, video devices, or the like. Such an intelligent controlled-environment facility resident communication and/or media device may be an Intelligent Facility Device (IFD) (e.g. a video phone particularly adapted for use in a controlled-environment facility) or an Intelligent Resident Device (IRD) (e.g. a personal wireless device, such as a tablet computing device or smartphone, which may be adapted and/or approved for use in controlled-environment facility), described in greater detail below. In accordance with embodiments of the present systems and methods, a controlled-environment facility resident interface runs on top of, or as part of, an operating system of a controlled-environment facility resident communication and/or media device. The interface may request, accept and verify identification information from a resident of the controlled-environment facility operating the device. The interface presents application programs (apps) available for use by the resident on the device, via the interface. A selected app, such as may be executed in accordance with embodiments of the present systems and methods, may provide the present controlled-environment facility resident contact tools, or contact tools may be incorporated into the interface itself.

Although exemplary embodiments described herein may refer to an unspecified type of "communication" or "message" it will be understood by those of skill in the art that any communication services may be supported by the present systems and methods. For example, a "communication" or "message" as used in the examples above may include, without limitation, a voice telephone call, a video communication, an email, a Short Message Service (SMS) text, a video conference, chat sessions, an interactive voice response (IVR) unit exchange, or the like. The present systems and methods can be used in two-person communications, and in multi-party communications.

Figure 1:
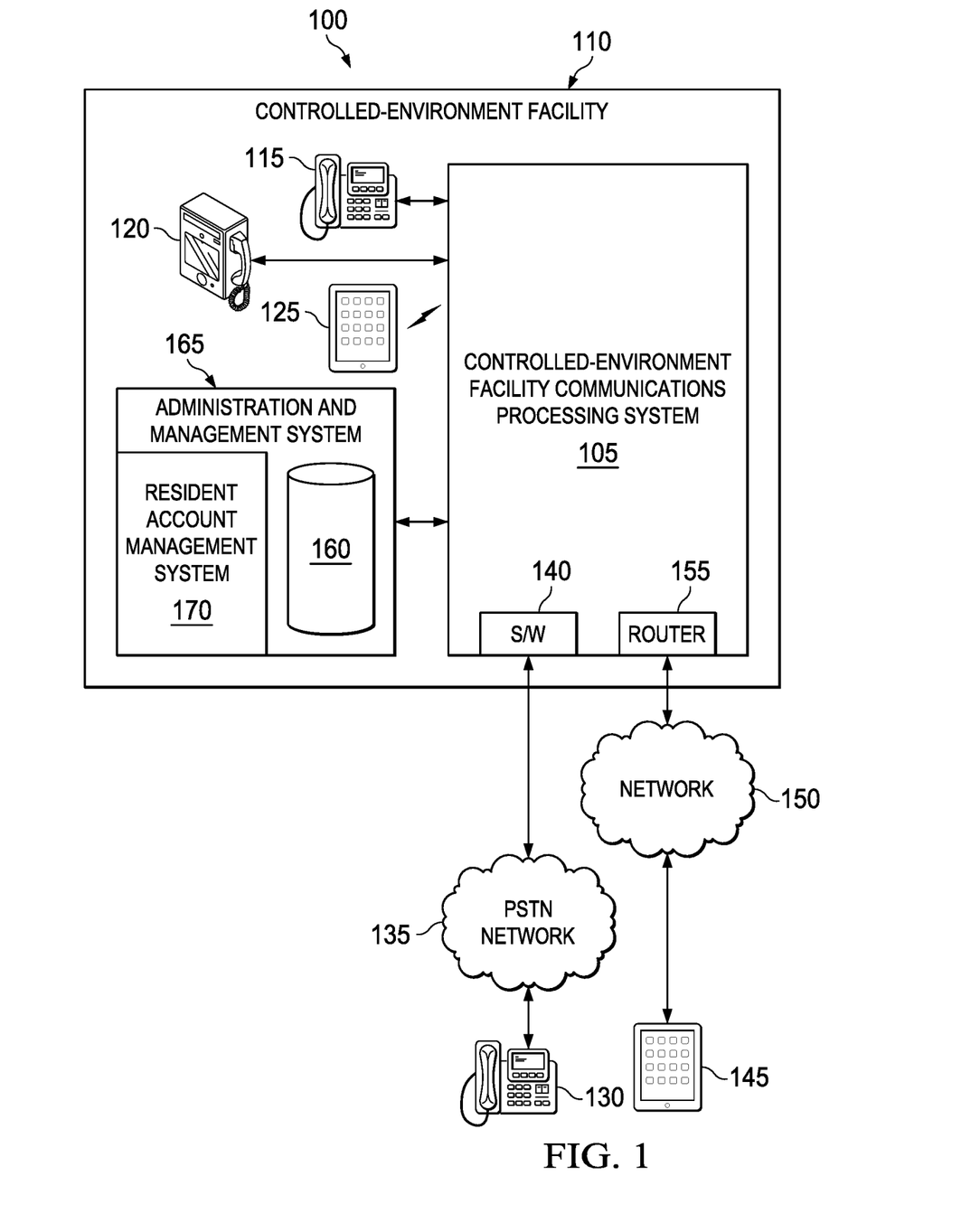
FIG. 1 is a diagrammatic illustration of an example communications environment, wherein example embodiments of a controlled-environment facility communications system for implementation of the present systems and methods for providing intelligent controlled-environment facility resident communication and/or media device interfaces may be employed, according to some embodiments of the present systems and methods.

FIG. 1 is a diagrammatic illustration of example communications environment 100, wherein example embodiments a controlled-environment facility communications system for implementation of the present systems and methods for providing intelligent controlled-environment facility resident communication and/or media device interfaces may be employed, according to some embodiments. As shown, communications processing system 105 may provide telephone services, videoconferencing, online chat, and other communication services to residents of controlled-environment facility 110. In some cases, such as illustrated, communications processing system 105 may be co-located with controlled-environment facility 110. Alternatively, communications processing system 105 may be centrally and/or remotely located with respect to one or more controlled-environment facilities and/or may provide communication services to multiple controlled-environment facilities. More generally, however, it should be noted that communications processing system 105 may assume a variety of forms, and may be configured to serve a variety of facilities and/or users, whether within or outside of a controlled-environment facility.

Residents may use more-or-less conventional telephones 115 to access certain communication services. However, in accordance with embodiments of the present systems and methods, residents may also use a controlled-environment communication and/or media device or the like. For example, a resident may use a video communication device 120, or the like, to place voice calls, as well as for video communication. Such a video communication device may be referred to as an Intelligent Facility Device (IFD), which may be a video phone particularly adapted for use in a controlled-environment facility. Generally speaking, multiple video communication devices/IFDs 120 are disposed in controlled-environment facility, and may be disposed in a visitation room, in a pod, as part of a kiosk, etc. Additionally or alternatively, in accordance with embodiments of the present systems and methods, personal computer wireless devices, such as a tablet computing device or smartphone (125), which may have been adapted and/or approved for use in controlled-environment facility, may be used by controlled-environment facility residents for communication. Such a personal resident device may be referred to as an Intelligent Resident Device (IRD), or the like, in controlled-environment facilities, in general and/or referred to as an Intelligent Inmate Device (IID) in a correctional institution environment. As will be appreciated, IFD 120, IRD 125, or other similar devices have video conferencing capabilities, or the like, to enable a party to participate in video communication sessions with other call parties, such as non-residents of the controlled-environment facility, via video communication, secure online chat, etc. Regardless, IFDs, IRDs, etc. may be generally referred to herein as a controlled-environment communication and/or media devices, or the like.

In various embodiments, video communication devices, IFDs 120, may be implemented as a computer-based system. For example, each of IFD 120 may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video communication session, IFD 120 may be configured to capture a video image of a resident to be transmitted to a non-resident using the camera, and to display a video image of the non-resident to the resident using the display. IFD 120 may also be configured to capture an audio signal from the resident to be transmitted to a non-resident using the mouthpiece portion of the handset, and to provide an audio signal from the non-resident to the resident using the earpiece portion of the handset. Additionally or alternatively, audio received from the non-resident may be reproduced via a loudspeaker, and audio provided by the resident may be captured via a microphone. In some cases, IFD 120 may assume the form of any computer, tablet computer, smart phone, etc., or any other consumer device or appliance with videoconferencing capabilities. For example, in a correctional facility environment a tablet computing device may be mounted on a wall, in a hardened case, as a video communication device or IFD.

IRDs 125 may be tablet computing devices, smartphones, media players, or the like adapted and/or approved for use by residents of the controlled-environment facility (within the controlled-environment facility). Each IRD 125 may be particularly adapted for use in a controlled-environment. For example, in a correctional institution, jail, or the like, such an IRD, or IID, may have a specially adapted operating system and/or may be "stripped-down," particularly from the standpoint of what apps and/or hardware are provided or allowed on IRD 125, and/or connectivity afforded such a IRD. For example, such an IRD may employ an operating system kernel built for use in such an IRD in a controlled-environment facility. As a further example, the IRD may be adapted to only connect to a network provided by the controlled-environment facility, and/or in only certain locations, within the controlled-environment facility, such as may be controlled by availability of Wi-Fi access, or the like, only being available in certain areas. That is, for example, where streaming and/or downloading may be compartmentalized, leveraging the structure of the controlled-environment facility, for example, limiting the availability of a Wi-Fi signal, providing the stream through the placement of wireless access points, antenna directionality of such wireless access points, and/or the like. Further, the IRD may allow access to apps or content only upon application of security measures, by the IRD. Such security measures may include determining, by the IRD, DNS spoofing, DNS redirection, use of proxy servers for privacy and security, biometric validation, password validation, and/or the like. Also, in accordance with embodiments of the present systems and methods, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on IRDs might include apps of particular interest to residents of the controlled-environment facility. For example, IRDs provided to inmates of correctional facilities, might include apps that may be of particular use to an inmate, in general, such as access to a legal research service, or of more specific interest, such as providing an inmate nearing release, access to employment searching apps or the like. Hence, such inmate IRDs may be used to help soon to be released inmates transition. For example, the IRD may be used to communicate with a future employer, or the like. As such, IRDs may be sponsored, or otherwise subsidized by organizations or companies, assisting with the transition of inmates into society.

In accordance with embodiments of the present systems and methods, controlled-environment facility resident communication and/or media device, IFD 120, IRD 125, or the like, may present via a resident interface, apps such as: a controlled-environment facility resident calling application, a video visitation application, a controlled-environment facility resident's manual, a controlled-environment facility resident form submittal program, a controlled-environment facility resident commissary ordering application, a music player, a video player, a web browser (which may be limited to only accessing secure websites and/or third party websites of approved vendors), a document reading program, an email application, a Prison Rape Elimination Act (PREA) information document, a PREA hotline, a legal research application, a job search application, a controlled-environment facility resident grievance submittal application, sick call app, education app, weather app, video mail, resident information app, games, a contacts functionality in accordance with embodiments of the present systems and methods, and/or the like.

In various embodiments, to access communication services, a resident may initiate telephone services by lifting the receiver on telephone 115 or IFD 120, and/or otherwise initiating a call, such as by launching a communications application program (app) on IRD 125. At which time, the resident may be prompted to provide a personal identification number (PIN), other identifying information or biometrics. An IVR unit (not shown, but which may be integrated into communication processing system 105) may generate and play a prompt, or other messages, to the resident on device 115, 120 or 125. Under the control of communication processing system 105, devices 115, 120 and 125 may be capable of connecting to a non-resident's (i.e., a person not incarcerated or otherwise committed to a controlled-environment facility) telephone 130 across a Publicly Switched Telephone Network (PSTN) 135. For example, telephone 130 may be located at a non-resident's home or office, at a resident visitation center, etc. Switch 140, in communication processing system 105, may be used to connect calls across PSTN 135. Additionally or alternatively, the non-resident may communicate using device 145, which may be a mobile phone, tablet computing device, personal computer, or the like, which may be connected through an Integrated Services Digital Network (ISDN), Voice-over-IP (VoIP), or packet data network (such as, for example the Internet), a wireless communications network, or the like 150. Router 155 of communication processing system 105 is used to route data packets associated with a call connection to device 145. For example, a non-resident party may have a device 145 with a built-in front-facing camera, or the like, and an integrated display (e.g., a smart phone, tablet, etc., as illustrated), a personal computer with a webcam, etc. A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards.

In addition to providing certain visitation and communication operations, communication processing system 105 may attempt to ensure that a resident's calls, video conferences, online chats, etc. are performed only with non-residents whose identities, devices, email addresses, phone numbers, etc. are listed in that resident's Pre-Approved Contact (PAC) and/or Pre-Approved Number (PAN) list. Each resident's PAC and/or PAN list(s) may be stored, for example, in database 160 maintained by controlled-environment Administration and Management System (AMS) 165. In addition to PAC and/or PAN list(s), AMS 165 may also store Resident Profile Data (RPD), as well as communication and/or visitation rules applicable to each resident. As an example, in the context of a correctional facility, AMS 165 may be referred to as a Jail Management System (JMS). Within the AMS or JMS 165, database 160 may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. Controlled-environment facility resident account management system 170, which may be a separate system, or which may be a part or function of AMS 165, as illustrated, may maintain resident accounts for the benefit of the respective resident, such as resident commissary accounts, resident communications accounts, which may be used to pay for communications, such as phone calls, video visitation, internet chats, emails, text messages, or the like, etc.

In some implementations, communication processing system 105 may be configured to perform communication monitoring operations, such being configured to monitor and or record communication sessions (e.g., as electronic video files). In scenarios where communication processing system 105 is located within the controlled-environment facility, it may have direct access to AMS or JMS 165. In other embodiments, however, communication processing system 105 may be located remotely with respect to the controlled-environment facility, and access to AMS or JMS 165 may be obtained via a computer network such as, for example, network 150.

Thus, in accordance with embodiments of the present systems and methods, a controlled-environment facility resident communication and/or media device, IFD 120, IRD 125, or the like, may include at least one processor and a memory coupled to the at least one processor, such as discussed in greater detail below, with reference to FIG. 4. This memory may be configured to store program instructions executable by the at least one processor. Such program instructions may include a controlled-environment facility resident communication and/or media device operating system and a controlled-environment facility resident interface program. This interface program may include program instructions executable by the at least one processors to cause controlled-environment facility resident communication and/or media device 120 or 125 to run the controlled-environment facility resident interface on top of, or as part of, the operating system and present apps available for use by a controlled-environment facility resident on the controlled-environment facility resident communication and/or media device. This interface may act as a resident communications platform, and also or alternatively, provide automated login for interface applications, provide a(n) (inter-active) controlled-environment facility bulletin board, etc. The interface may request and accept identification information from the resident, such as information that may confirm the identity of the resident. This identification may be verified, such as through the interface, by controlled-environment facility communications processing system 105, AMS 165, and/or the like, to complete such a login. In accordance with embodiments of the present systems and methods, the interface program instructions may also permit and/or facilitate execution of the apps, such as when one of these apps is selected by the resident, via the interface. For example, the interface may present the present controlled-environment facility resident contact tool(s) as an application under, or as part of, the intelligent controlled-environment facility resident communication and/or media device interface. The interface may also countdown a predetermined amount of time the selected app remains active, a predetermined number of times that an app can be opened, a predetermined number of times that a form can be submitted, a predetermined time an app remains open and/or is executed, multitasking functionality between open apps, etc.

Thus, in accordance with embodiments of the present systems and methods a controlled-environment facility communications system that includes, for example controlled-environment facility communications processing system 105 and controlled-environment facility administration and management system 165. Therein, controlled-environment facility resident communication and/or media device(s) (120, 125), may employ an operating system and a controlled-environment facility resident interface running on top of, or as part of, the operating system.

Figure 2:
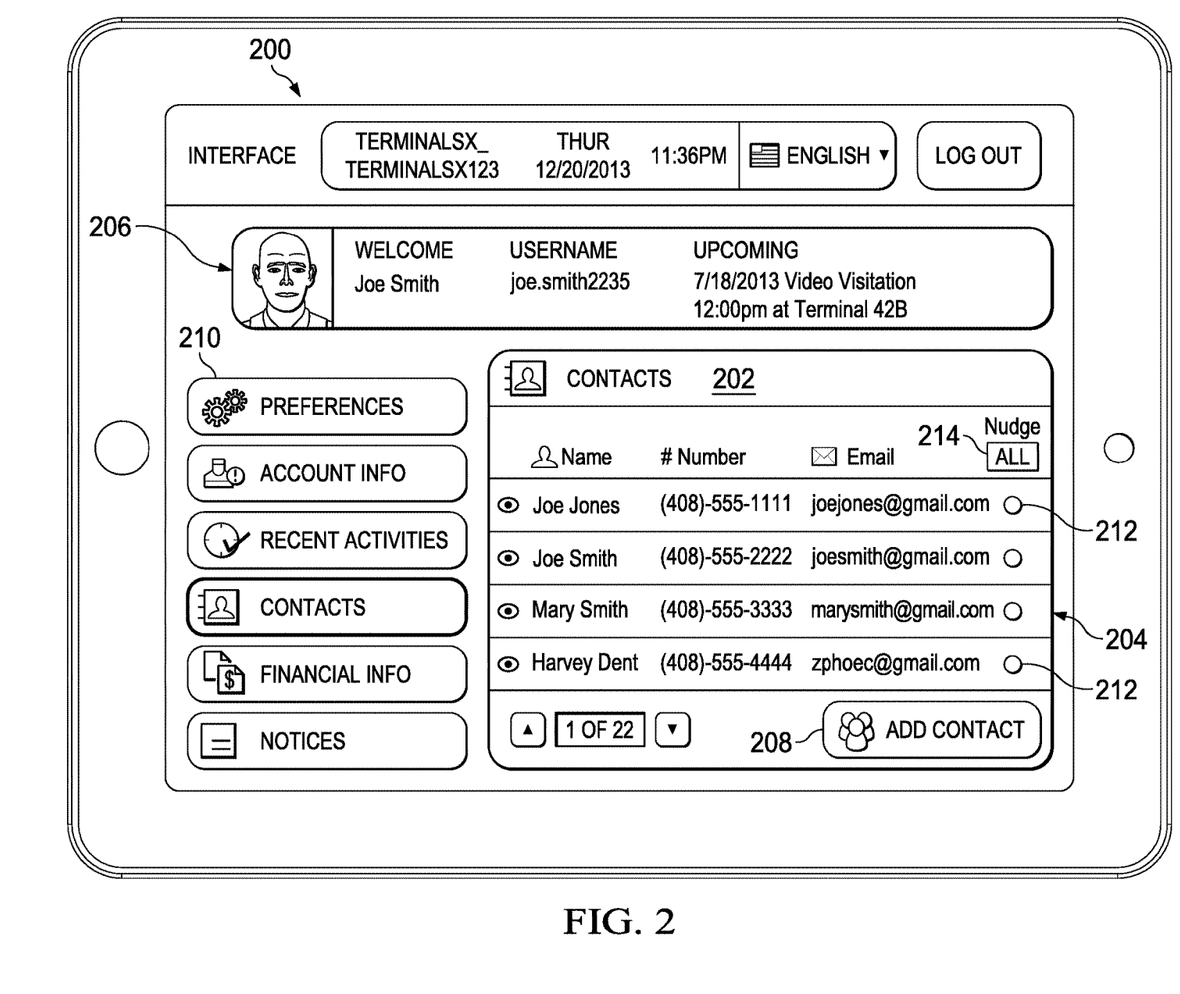
FIG. 2 is a diagrammatic illustration of an example intelligent controlled-environment facility communication and/or media device interface, showing an example controlled-environment facility resident communication and/or media device interface contact page, according to some embodiments of the present systems and methods.

Turning now additionally to FIG. 2, which is a diagrammatic illustration of an example intelligent controlled-environment facility communication and/or media device interface 200, showing an example controlled-environment facility resident communication and/or media device interface contact page 202, according to some embodiments of the present systems and methods. FIG. 2 generally shows example intelligent controlled-environment facility communication and/or media device interface 200, with contact page 202 on an IRD (IRD), or the like. However, similar interface and/or contact functionality may be provided by an IFD (120), or the like.

Controlled-environment facility resident interface 200 may run on top of, or as part of, the operating system of the controlled-environment facility resident communication and/or media device. Interface 200 presents contact list 204 of non-residents of the/a controlled-environment facility for each resident of the controlled-environment facility to the respective resident 206. Contact list 204 may be maintained in conjunction with, or by, controlled-environment facility communications processing system 105 and/or in conjunction with, or by controlled-environment facility administration and management system 165 (such as on database 160). Interface 200 may also present, upon selection of "add contact" button 208, the resident an interface to input name and contact information for new contacts. Additionally or alternatively, controlled-environment facility communications processing system 105, controlled-environment facility administration and management system 165, and/or the at least one resident communication and/or media device 120 or 125 may auto-populate contact list 204. For example, respective contact list 204 may be auto-populated from a PAC or PAN list for the respective resident, such as may be maintained by controlled-environment facility communications processing system 105 and/or controlled-environment facility administration and management system 165 (such as on database 160). Respective contact list 204 may additionally or alternatively be auto-populated by controlled-environment facility communications processing system 105 and/or controlled-environment facility administration and management system 165 based-on recent electronic communications by the respective resident 206, such as by adding a contact and/or contact information based up a phone number email address, or the like used to carry-out an electronic communication.

Embodiments of the present systems and methods may be used to transmit messages to contacts 204, in the name of respective resident 206, such as via controlled-environment facility communications processing system 105, or the like. Controlled-environment facility resident communication and/or media device interface 200 may afford the resident an option, such as via preferences button 210, or the like, to turn automatic transmission of messages to his or her contacts, in the name of resident, on or off. Further the resident may "manually" "nudge" i.e. send a (pre-composed) message to one or all of the resident's contacts, such as via buttons 212 or 214, respectively. Hence, the messages may be instituted by the resident, via the controlled-environment facility resident interface 200, for transmission. The number of requests by a particular resident to institute messages, per pre-configurable time period, to a particular phone number and/or to a particular email address may be limited, in accordance with embodiments of the present systems and methods, such as may be based upon the particular resident's privilege status, or the like. Such, requests by residents to institute a message may be logged and the log of the requests may be viewable by controlled-environment facility staff members with an appropriate level of access.

Other contact options may be presented to the resident via interface 200. For example, the resident may be enabled, such as via preferences, to arrange the order of the type of communication used to send the message, to arrange the order the contacts are messaged, and, or the like. Further preferences for handling contacts and communications therewith are discussed in the above incorporated co-owned and co-pending U.S. patent application Ser. No. 15/077,980, directed to "Indicator of Likelihood of Establishing a Communication Connection for Communication System."

In accordance with various embodiments of the present systems and methods, a messaging option may be afforded to non-resident contacts via a website, such as may be accessed via non-resident equipment (e.g. non-resident device 145, or the like) and/or an IFD (120) providing a non-resident customer interface. Such option may afford the non-resident an opportunity to subscribe, unsubscribe, opt-in and/or opt-out of the automatic transmission of messages to them from a particular resident.

Figure 3:
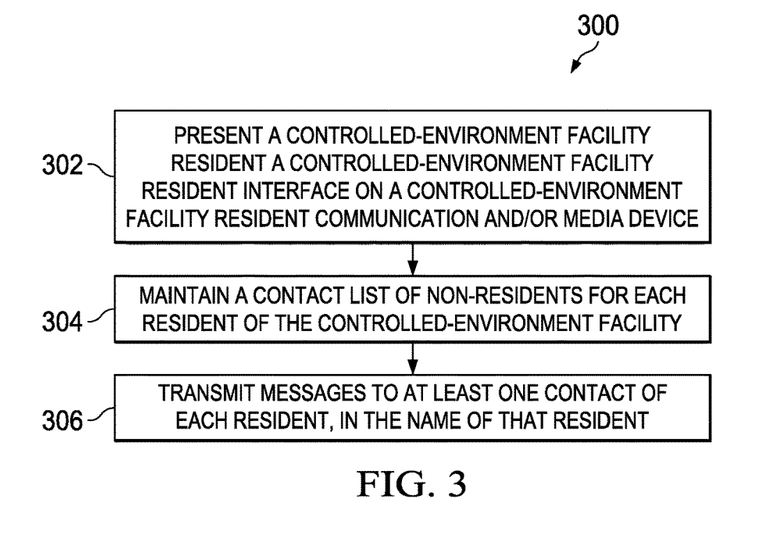
FIG. 3 is a flowchart of an example process for providing controlled-environment facility resident contact tools via an intelligent controlled-environment facility resident communication and/or media device interface, in accordance with some embodiments of the present systems and methods.

FIG. 3 is a flowchart of example process 300 for providing controlled-environment facility resident contact tools via an intelligent controlled-environment facility resident communication and/or media device interface (200), in accordance with some embodiments of the present systems and methods. Method 300 may include running a controlled-environment facility resident interface (200) on top of, or as part of, an operating system of the controlled-environment communication and/or media device (120, 125, etc.). Thereunder, as noted, identification information may be requested and accepted from the resident, such as via the interface. Upon verification of the identification information, such as through the interface (200), by a controlled-environment facility communications processing system (105), an AMS/JMS (165), and/or the like, apps available for use by a resident of the controlled-environment facility who is operating the controlled-environment communication and/or media device may be presented, via the controlled-environment facility resident interface (200), such as via icons. This presents the app in a presentation layer on top of an operating system layer on the device. These apps maybe a part of the interface, integrated into the interface, or may run on top of, or as part of, the interface. Selection of one of the apps by the resident may result in launching (or execution) of the selected app, such as a contacts app or interface functionality, which may include logging the resident into the selected app using stored application program login information, with respect to the app, for the resident.

At 302 In controlled-environment facility communications system implemented method 300, a controlled-environment facility resident is presented a controlled-environment facility resident interface (200), by a controlled-environment facility resident communication and/or media device, on the controlled-environment facility resident communication and/or media device at 302, including a contact list (204) for the resident.

The contact list of non-residents of the/a controlled-environment facility is maintained for each resident of the controlled-environment facility at 304. This contact list may be established by accepting input by the resident via the controlled-environment facility resident interface to input name and contact information for the contacts. For example, the interface may enable the resident to enter a first name, last name, email address, phone number, home address, business address, etc., for a contact. Alternatively or additionally, embodiments of the present systems and methods may auto-populate the contact list. This auto-populating may include auto-populating the respective contact list from a PAN or PAC list for the respective resident maintained by the controlled-environment facility communications processing system (105) and/or the controlled-environment facility administration and management system (165). Further still, auto-populating respective contact list for a respective resident may additionally or alternatively include auto-populating the respective contact list based on recent electronic communications by the respective resident. For example, recent calling or other electronic communications may be used for auto-populating a contact list, such as by automatically including a successfully contacted number or other contact information (e.g. from calls or other electronic communications that were successfully connected or delivered) in a resident's contact list. Regardless, residents may be afforded an ability to add, edit or delete contacts via the interface. However, in accordance with some embodiments of the present systems and methods, a maximum number of contacts, per a configurable time period, may be configured by a (particular) resident.

Messages are transmitted to at least one contact of each resident, in the name of the respective resident, at 306. These messages may comprise standardized requests common to all residents. These standardized requests may be configurable by the facility. That is, resident requests may consist of several standard consistent requests. However, an option may be provided to the resident to compose on-demand messages with configurable text. Regardless, the messages may be "nudges" to the contacts to take an action with respect to the resident. For example, the nudge may ask the contact to make a deposit to a trust account maintained for the benefit of the resident, ask the contact to initiate and/or otherwise setup a video visitation session with the resident, ask the contact to communicate with the contact (e.g. say something such as, "I'm trying to reach you") or the like. In accordance with such embodiments, the interface may provide each resident with an ability to send some automatic, standardized messages. Such automatic functionality for sending messages may be contingent on occurrences such as, low funds, ability to have a visitation, birthdays, or the like. Hence, the interface may provide each resident with options such as, "check this box to send a message to my contacts every time my funds get low," or, "check this box to send a message to request a visitation every week."

Further, the resident interface may accept input by the resident to turn transmission of messages in the name of the resident on and off. Conversely, a non-resident contact may be provided options to subscribe, unsubscribe, opt-in and/or opt-out of transmission, or at least reception, of messages from a particular resident, to, in effect, block the transmission of messages to the contact. These options may be provided to non-resident contacts via a website and/or an IFD interface providing a non-resident customer interface.

Hence, the transmission of messages at 306, may be instituted by the resident, via the controlled-environment facility resident interface on the controlled-environment facility resident communication and/or media device, for transmission in a "manual" manner (e.g. upon selection of a contact to nudge with a particular message) or in an automated manner (e.g. upon satisfaction of a condition, using a selected or pre-composed message). Thusly, the transmission of messages, in the name of the respective resident, at 306 may be configurable to be enabled or disabled by customer, site, terminal, and inmate, and may be organized, as discussed above.

In accordance with embodiments of the present systems and methods requests by residents to institute a message may be logged and a log of the requests may be made viewable by controlled-environment facility staff members who have an appropriate level of access. Further in this regard, the number of requests by a particular resident to institute a message may be limited, per pre-configurable time period, to a particular phone number and/or email address, and/or otherwise limited in accordance with controlled-environment facility policy or procedures. For example, the number of message requests allowed by a particular resident may be limited, based at least in part on a resident privilege status of that particular resident. In contrast, under certain circumstances a resident may be allowed to broadcast a common message to everyone on that resident's contact list, via the controlled-environment facility resident interface. For example, the resident interface may provide an option such as "click here to send this message to all your contacts," or the like, such as upon selection of a particular message by the resident.

Various elements of the present controlled-environment facility resident contact tools for intelligent controlled-environment facility resident communication and/or media device interfaces may be implemented as modules. Modules may be implemented in hardware. In another embodiment, modules may be expressed in software executed by hardware. In still another embodiment, modules may be implemented in firmware operated by hardware. In still other embodiments, modules may be implemented in combinations of hardware, software, and/or firmware. Embodiments of the present systems and methods for providing controlled-environment facility resident contact tools for intelligent controlled-environment facility resident communication and/or media device interfaces, as described herein, may be implemented or executed, at least in part, by one or more computer systems. One such computer system is illustrated in FIG. 4. In various embodiments, computer system 400 may be a server, a mainframe computer system, a workstation, a network computer, a desktop computer, a laptop, a tablet computing device, media player, or the like. For example, in some cases, one or more of controlled environment facility management system 105, IFD 120, IRD 125, non-resident media device 145, AMS 165 (resident account management system 170) and/or the like, may be implemented, in part, or in whole, as a computer system such as computer system 400. Likewise, a computer system, such as computer system 400 may implement one or more steps of example process 300 described above with respect to FIG. 3. In various embodiments two or more of these computer systems may be configured to communicate with each other in any suitable way, such as, for example, via a network. For example, in FIG. 1, IFD 120 and/or IRD 125 are illustrated as communicating with non-resident equipment 130 and/or 145, via one or more of networks 135 and 150, through controlled-environment facility communication processing system 105. As a further example, IRD 125 is illustrated as wirelessly communicating with controlled-environment facility communication management system 105 using wireless functionality, such as a wireless data network (i.e. a Wi-Fi network, or the like). In such a controlled-environment facility wireless network, IFD 120 may act as a Wi-Fi (or wired) access point or router, such as for IRD 125, in accordance with some embodiments of the present systems and methods.

As illustrated, example computer system 400 includes one or more processors 410 coupled to a system memory 420 via an input/output (I/O) interface 430. Example computer system 400 further includes a network interface 440 coupled to I/O interface 430, and one or more input/output devices 450, such as video device(s) 460 (e.g., a camera), audio device(s) 470 (e.g., a microphone and/or a speaker), and display(s) 480. Computer system 400 may also include a cursor control device (e.g., a mouse or touchpad), a keyboard, etc. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In various embodiments, computer system 400 may be a single-processor system including one processor 410, or a multi-processor system including two or more processors 410 (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or other dedicated graphics-rendering device.

System memory 420 may be configured to store program instructions and/or data accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 3, above, may be stored within system memory 420 as program instructions 425 and data storage 435, respectively. In other embodiments, program instructions and/or data may be received, sent or stored upon different types of computer-accessible media or on similar media separate from system memory 420 or computer system 400. Generally speaking, a computer-readable medium may include any tangible or non-transitory storage media or memory media such as magnetic or optical media—e.g., disk or CD/DVD-ROM coupled to computer system 400 via I/O interface 430, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 440.

In some embodiments, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any suitable protocol, timing or other data transformations to convert data signals from one component (e.g., system memory 420) into a format usable by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments, some or all of the functionality of I/O interface 430, such as an interface to system memory 420, may be incorporated into processor 410.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Figure 4:
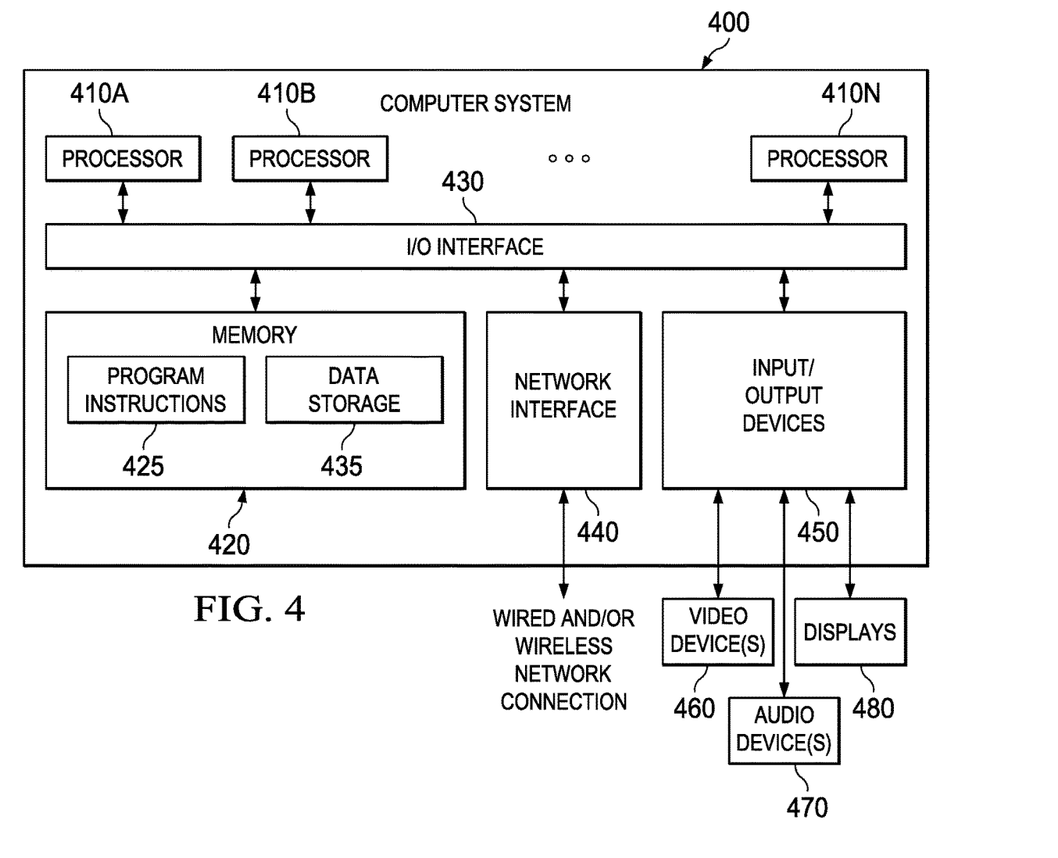
FIG. 4 is a block diagram of a computer system, device, station, or terminal configured to implement various techniques disclosed herein, according to some embodiments.

As shown in FIG. 4, memory 420 may include program instructions 425, configured to implement certain embodiments described herein, and data storage 435, comprising various data accessible by program instructions 425. In an embodiment, program instructions 425 may include software elements corresponding to one or more of the various embodiments illustrated in the above figures. For example, program instructions 425 may be implemented in various embodiments using any desired programming language, scripting language, or combination of programming languages and/or scripting languages (e.g., C, C++, C #, JAVA®, JAVASCRIPT®, PERL®, etc.). Data storage 435 may include data that may be used in these embodiments. In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controlled-environment facility communications system comprising:

a controlled-environment facility communications processing system comprising at least one processor coupled to a memory configured to store program instructions executable by the at least one processor to cause the controlled-environment facility communications processing system to provide communication services to residents of a controlled-environment facility;

a controlled-environment facility administration and management system comprising at least one processor coupled to a memory configured to store program instructions executable by the at least one processor to cause the controlled-environment facility administration and management system to provide controlled-environment facility administration and management with respect to residents of the controlled-environment facility; and at least one controlled-environment facility resident communication and/or media device, each controlled-environment facility resident communication and/or media device comprising:

at least one processor;

a memory coupled to the at least one processor and configured to store program instructions executable by the at least one processor, the program instructions comprising:

a controlled-environment facility resident communication and/or media device operating system; and a controlled-environment facility resident interface program configured to cause the controlled-environment facility resident communication and/or media device to:

run the controlled-environment facility resident interface on top of, or as part of, the operating system;

present a contact list, comprising outside non-residents of a controlled-environment facility, for a respective resident of the controlled-environment facility, to the respective resident; and automatically transmit nudge messages to the contacts, via the controlled-environment facility communications processing system, by the controlled-environment facility, for the respective resident for each contact to take an action with respect to the respective resident.

2. The controlled-environment facility communications system of claim 1, wherein the contact list is maintained in conjunction with the controlled-environment facility communications processing system.

3. The controlled-environment facility communications system of claim 1, wherein the contact list is maintained in conjunction with the controlled-environment facility administration and management system.

4. The controlled-environment facility communications system of claim 1, wherein the controlled-environment facility resident interface program is further configured to cause the controlled-environment facility resident communication and/or media device to present the resident an interface to input name and contact information for the contacts.

5. The controlled-environment facility communications system of claim 1, wherein the controlled-environment facility communications processing system, the controlled-environment facility administration and management system and/or the at least one resident communication and/or media device auto-populates the contact list for at least one resident.

6. The controlled-environment facility communications system of claim 5, wherein the respective contact list is auto-populated from a pre-approved contact list and/or pre-approved number list for the respective resident maintained by the controlled-environment facility communications processing system and/or the controlled-environment facility administration and management system.

7. The controlled-environment facility communications system of claim 5, wherein the respective contact list is auto-populated by the controlled-environment facility communications processing system and/or the controlled-environment facility administration and management system based on recent electronic communications by the respective resident.

8. The controlled-environment facility communications system of claim 5, wherein the respective contact list is auto-populated by the controlled-environment facility communications processing system and/or the controlled-environment facility administration and management system based on recent electronic communications by the respective resident that were successfully connected.

9. A controlled-environment facility communications system implemented method comprising:
presenting a controlled-environment facility resident a controlled-environment facility resident interface, by a controlled-environment facility resident communication and/or media device, on the controlled-environment facility resident communication and/or media device;
maintaining a contact list of outside non-residents of the controlled-environment facility for each resident of the controlled-environment facility; and
automatically transmitting nudge messages to at least one contact of each resident, by the controlled-environment facility, for that resident, to take an action with respect to the resident.

10. The method of claim 9, further comprising the controlled-environment facility communications system auto-populating the contact list for at least one resident.

11. The method of claim 10, wherein auto-populating respective contact list for a respective resident comprises auto-populating the respective contact list from a pre-approved contact list and/or pre-approved number list for the respective resident.

12. The method of claim 10, wherein auto-populating respective contact list for a respective resident comprises auto-populating the respective contact list based on recent electronic communications by the respective resident.

13. The method of claim 9, further comprising accepting input by the resident via the controlled-environment facility resident interface to input name and contact information for the contacts.

14. The method of claim 9, wherein the messages comprise standardized requests common to all residents.

15. The method of claim 9, further comprising enabling the controlled environment facility to create a configurable message.

16. The method of claim 9, further comprising accepting input by the resident via the controlled-environment facility resident interface to turn transmitting messages for in the name of that resident on and off.

17. The method of claim 9, further comprising accepting input by the resident via the controlled-environment facility resident interface to transmit a same message, by the controlled-environment facility, for that resident, to every contact in the contact list of that resident.

18. The method of claim 9, wherein the action is for the contact to make a deposit to a trust account maintained for the benefit of the resident.

19. The method of claim 9, wherein the action is for the contact to initiate and/or setup a video visitation session with the resident.

20. The method of claim 9, wherein the message is a request to communicate with the contact.

21. The method of claim 9, further comprising providing each contact options to block the transmission of messages to the contact for the resident.

22. The method of claim 9, further comprising providing each contact options to opt in or opt out of the transmission of messages to the contact for the resident.

23. The method of claim 9, wherein the messages are instituted by the resident, via the controlled-environment facility resident interface on the controlled-environment facility resident communication and/or media device, for transmission.

24. The method of claim 23, further comprising:
logging requests by residents to institute messages; and
making a log of the requests viewable by controlled-environment facility staff members with an appropriate level of access.

25. The method of claim 23, further comprising limiting a number of requests by a particular resident to institute messages, per a pre-configurable time period, to a particular phone number.

26. The method of claim 25, wherein the number of requests by the particular resident are based at least in part on a resident privilege status of the particular resident.

27. The method of claim 23 further comprising limiting a number of requests by a particular resident to institute a message, per a pre-configurable time period, to a particular or email address.

28. The method of claim 27, wherein the number of requests by the particular resident are based at least in part on a resident privilege status of the particular resident.

29. A tangible non-transitory computer-readable storage medium having program instructions stored thereon that, upon execution by a controlled-environment facility communications system, cause the system to:
- present a controlled-environment facility resident a controlled-environment facility resident interface, by a controlled-environment facility resident communication and/or media device, on the controlled-environment facility resident communication and/or media device;
- maintain a contact list of outside non-residents for each resident of a controlled-environment facility; and
- automatically transmit nudge messages, for that resident, to at least one contact of the resident to take an action with respect to the resident.

30. The tangible non-transitory computer-readable storage medium of claim 29, wherein the program instructions further cause the system to auto-populate the contact list for at least one resident based on recent electronic communications by each respective resident.

31. The tangible non-transitory computer-readable storage medium of claim 29, wherein the program instructions further cause the system to auto-populate the contact list for at least one resident from a pre-approved contact list and/or pre-approved number list for each respective resident.

* * * * *

UNITED STATES PATENT AND TRADEMARK OFFICE
CERTIFICATE OF CORRECTION

PATENT NO. : 10,609,094 B1
APPLICATION NO. : 15/285835
DATED : March 31, 2020
INVENTOR(S) : Clements et al.

Page 1 of 1

It is certified that error appears in the above-identified patent and that said Letters Patent is hereby corrected as shown below:

In the Claims

In Column 18, Line 67, Claim 27, delete "or".

Signed and Sealed this
Twelfth Day of May, 2020

Andrei Iancu
*Director of the United States Patent and Trademark Office*